(12) United States Patent
Yamauchi (10) Patent No.: US 11,577,704 B2
(45) Date of Patent: Feb. 14, 2023

(54) VEHICLE BRAKE SYSTEM

(71) Applicant: TOYOTA JIDOSHA KABUSHIKI KAISHA, Toyota (JP)

(72) Inventor: Yoji Yamauchi, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 17 days.

(21) Appl. No.: 17/083,851

(22) Filed: Oct. 29, 2020

(65) Prior Publication Data

US 2021/0129812 A1 May 6, 2021

(30) Foreign Application Priority Data

Oct. 31, 2019 (JP) .............................. JP2019-198798

(51) Int. Cl.
 *B60T 8/1766* (2006.01)
 *B60T 8/1755* (2006.01)

(52) U.S. Cl.
 CPC .......... *B60T 8/1766* (2013.01); *B60T 8/1755* (2013.01); *B60T 2230/04* (2013.01)

(58) Field of Classification Search
 CPC ...... B60T 8/1706; B60T 8/241; B60T 8/3225; B60T 2201/16; B60T 2220/04; B60T 2230/02; B60T 2250/04; B60T 2270/10; B60T 2270/30; B62L 1/00; B62L 3/023
 See application file for complete search history.

(56) References Cited

U.S. PATENT DOCUMENTS

| | | | |
|---|---|---|---|
| 2010/0256847 A1 | 10/2010 | Kimbara et al. | |
| 2016/0297303 A1* | 10/2016 | Sawada | B60L 3/08 |
| 2021/0269001 A1* | 9/2021 | Suzuki | B60T 7/12 |

FOREIGN PATENT DOCUMENTS

| | | |
|---|---|---|
| JP | 4-5155 A | 1/1992 |
| JP | 11-11281 A | 1/1999 |
| JP | 2000-43697 A | 2/2000 |
| JP | 2007-320475 A | 12/2007 |
| JP | 2008-62756 A | 3/2008 |
| JP | 2009-173092 A | 8/2009 |

* cited by examiner

*Primary Examiner* — Yuen Wong
(74) *Attorney, Agent, or Firm* — Sughrue Mion, PLLC (57) ABSTRACT

A vehicle brake system installed on a vehicle equipped with an electric motor that applies a drive force to a wheel, including: a brake device configured to apply a braking force to the wheel; and a brake controller configured to control the braking force, wherein the brake controller is configured to execute a swinging-back reducing control for reducing swinging-back of a body of the vehicle on stopping by weakening the braking force immediately before the vehicle stops, based on a motor-rotation-speed-dependent running speed that is a running speed of the vehicle detected in dependence on a rotation speed of the electric motor.

5 Claims, 7 Drawing Sheets

VEHICLE BRAKE SYSTEM

CROSS REFERENCE TO RELATED APPLICATION

The present application claims priority to Japanese Patent Application No. 2019-198798, which was filed on Oct. 31, 2019, the disclosure of which is herein incorporated by reference in its entirety.

BACKGROUND

Technical Field

The following disclosure relates to a vehicle brake system installed on a vehicle equipped with an electric motor that applies a drive force to a wheel.

Description of Related Art

For reducing swinging-back of a body of a vehicle on stopping, a control is executed in which a braking force applied to a wheel by a brake device is weakened immediately before the vehicle stops, as disclosed in Patent Document 1 (Japanese Patent Application Publication No. 2007-320475), for instance. The control will be hereinafter referred to as "swinging-back reducing control for reducing swinging-back of the vehicle body on stopping" where appropriate.

SUMMARY

The swinging-back reducing control for reducing swinging-back of the vehicle body on stopping (hereinafter simply referred to as "swinging-back reducing control" where appropriate) is executed based on a running speed of the vehicle (hereinafter referred to as "vehicle speed" where appropriate). The vehicle is provided with a wheel speed sensor for detecting a wheel rotation speed to execute an antilock braking control (ABS control) or the like, for instance. (The wheel rotation speed will be hereinafter referred to as "wheel speed" where appropriate.) The known vehicle brake system described above is configured to detect the vehicle speed in dependence on the wheel speed detected by the wheel speed sensor, so as to execute tire swinging-back reducing control based on the detected vehicle speed. However, the detection accuracy of the wheel speed by the wheel speed sensor is relatively low, and the detection accuracy of the vehicle speed detected in dependence on the wheel speed is accordingly low. (This vehicle speed means the vehicle speed detected based on the directly detected wheel speed and will be hereinafter referred to as "wheel-rotation-speed-dependent running speed" where appropriate.) It is noted that the swinging-back reducing control is executed immediately before the vehicle stops, namely, the swinging-back reducing control is executed when the vehicle speed is considerably low. Thus, if the swinging-back reducing control were executed based on the vehicle speed detected in dependence on the wheel speed, the control accuracy would inevitably become low. Accordingly, one aspect of the present disclosure is directed to a vehicle brake system capable of executing a highly-accurate swinging-back reducing control for reducing swinging-back of the vehicle body on stopping.

In one aspect of the present disclosure, a vehicle brake system is installed on a vehicle equipped with an electric motor that applies a drive force to a wheel (hereinafter referred to as "drive motor" where appropriate), the brake system being configured to execute a swinging-back reducing control based on a vehicle speed detected in dependence on a rotation speed of the electric motor. (This rotation speed will be hereinafter referred to as "motor rotation speed" where appropriate.)

As later explained in detail, the drive motor of electric vehicles, hybrid vehicles, etc., includes a motor rotation angle sensor such as a resolver, an encoder or the like, for detecting the motor rotation speed and a rotation angle (electrical angle) of the motor. The detection accuracy of the motor rotation angle by the motor rotation angle sensor is relatively high. Further, the drive motor is connected to the wheel via a drive force transmitting mechanism. Thus, in a case where the vehicle speed is detected in dependence on the motor rotation speed that is detected based on a detection signal of the motor rotation angle sensor, the detection accuracy of the vehicle speed is relatively high. (This vehicle speed will be hereinafter referred to as "motor-rotation-speed-dependent running speed" where appropriate.) In the vehicle brake system of the present disclosure, the swinging-back reducing control is executed based on the motor-rotation-speed-dependent running speed, so that the control accuracy of the swinging-back reducing control is high.

Various Forms

There will be exemplified and explained various forms of the vehicle brake system of the present disclosure. Each of the forms is numbered like the appended claims and depends from the other form or forms, where appropriate. This is for easier understanding of the present disclosure, and it is to be understood that combinations of constituent elements that constitute the vehicle brake system of the present disclosure are not limited to those described in the following forms. That is, it is to be understood that the vehicle brake system of the present disclosure shall be construed in the light of the following description of various forms and embodiments. It is to be further understood that, as long as the present disclosure is construed in this way, any form in which one or more constituent elements is/are added to or deleted from any one of the following forms may be considered as one form of the vehicle brake system of the present disclosure.

(1) A vehicle brake system installed on a vehicle equipped with an electric motor that applies a drive force to a wheel, including:
  a brake device configured to apply a braking force to the wheel: and
  a brake controller configured to control the braking force,
  wherein the brake controller is configured to execute a swinging-back reducing control for reducing swinging-back of a body of the vehicle on stopping by weakening the braking force immediately before the vehicle stops, based on a motor-rotation-speed-dependent running speed that is a running speed of the vehicle detected in dependence on a rotation speed of the electric motor.

This form is a basic form. According to this form, the swinging-back reducing control is executed based on the motor-rotation-speed-dependent running speed, so that the control accuracy of the swinging-back reducing control is high.

The vehicle on which the vehicle brake system of this form is installed is not limited to the vehicle driven only by the electric motor, namely, an electric vehicle, but may be a vehicle that utilizes, as a drive source, both the electric motor and the engine, i.e., a hybrid vehicle. Further, the brake device is not limited to a hydraulic brake device configured to apply, to the wheel, a braking force whose magnitude corresponds to the pressure of the working fluid, but may be a brake device configured to push friction members onto a rotary body that rotates with the wheel by a force generated by the electric motor, i.e., an electric brake device. It is noted that the brake device is desirably configured to generate the braking force without relying on a force by which the driver operates a brake operation member and to electronically control the magnitude of the braking force to be generated. That is, it is preferable that the brake device be what is called brake-by-wire brake device.

The rotation speed of the electric motor, namely, the rotation speed of the drive motor, may be detected by using a motor rotation angle sensor of the drive motor, such as the resolver or the encoder, that is used for controlling electric current supply to the drive motor. The use of the motor rotation angle sensor enables the rotation speed of the drive motor to be detected with high accuracy. Thus, the vehicle running speed con be accurately detected even immediately before the vehicle stops, that is, even when the vehicle running speed is considerably low, owing to the motor-rotation-speed-dependent running speed.

The drive force by the electric motor need not be necessarily applied to the wheel to which the braking force is applied by The brake device. In a case where the vehicle on which the vehicle brake system of this form is installed is a vehicle having four wheels, i.e., two front wheels and two rear wheels, the drive force by the electric motor may be applied to only the two front wheels that are drive wheels though the braking force is applied to all of the four wheels.

Concerning the way of weakening the braking force in the swinging-back reducing control, it is preferable that the braking force applied in the swinging-back reducing control be gradually weakened. In other words, it is preferable that the swinging-back reducing control be executed such that deceleration of the vehicle is gradually lowered because the braking force applied to the vehicle may be considered as being equivalent to the deceleration of the vehicle.

(2) The vehicle brake system according to the form (1), further including a brake operation member to be operated by a driver, wherein the brake controller is configured to execute a brake-operation-dependent control in which the braking force having a magnitude corresponding to an operation of the brake operation member is applied to the wheel, die brake controller being configured to execute the swinging-back reducing control in place of the brake-operation-dependent control.

This form includes limitation as to a control that the brake controller is executing before execution of the swinging-back reducing control, namely, limitation as to an ordinary control executed by the brake controller. In the brake-operation-dependent control, based on an operation amount or an operation force of a brake pedal as one example of the brake operation member, the hydraulic pressure of the working fluid to be supplied to a wheel cylinder of a brake caliper is controlled if the brake device is the hydraulic brake device or the electric current to be supplied to the electric motor to drive a piston for pushing pads onto a disc rotor is controlled if the brake device is the electric brake device.

(3) The vehicle brake system according to the form (2), wherein the brake controller is configured to execute the swinging-back reducing control on precondition that the braking force applied in the brake-operation-dependent control is not greater than a set braking force.

This form includes a precondition as to execution of the swinging-back reducing control. The need for executing the swinging back reducing control is low in a case where a driver brakes suddenly for danger avoidance. The driver usually eases up on the brake operation and stops the vehicle when the vehicle speed is sufficiently decreased by the brake operation. In view of the fact that execution of the swinging-back reducing control is significant in such stopping of the vehicle, the swinging-back reducing control is executed on the precondition that the braking force is small to a certain extent. As described above, the braking force may be considered as being equivalent to the deceleration of the vehicle. Thus, the condition that the braking force is not greater than the set braking force may be understood as a condition that the deceleration of the vehicle is not greater than the set deceleration.

(4) The vehicle brake system according to any one of the forms (1) through (3), wherein the brake controller is configured to start the swinging-back reducing control at a time point when tic motor-rotation-speed-dependent running speed becomes equal to or lower titan a set running speed of the vehicle.

This form includes limitation as to a trigger for starting the swinging-back reducing control. The swinging-back reducing control is for weakening the braking force. From the viewpoint of making the braking distance as short as possible, the swinging-back reducing control is preferably executed as late as possible, that is, the swinging-back reducing control is preferably started from a time point when the vehicle running speed becomes as low as possible. In this form, the use of the motor-rotation-speed-dependent running speed enables the swinging-back reducing control to be started at a time point when the vehicle is sufficiently decelerated.

(5) The vehicle brake system according to any one of the forms (1) through (4), wherein the brake controller is configured to execute the swinging-back reducing control such that:

the brake controller determines a target running speed of the vehicle such that the running speed of the vehicle gradually decreases from a start time point of the swinging-back reducing control to an intended stop rime point of the vehicle that is a stop time point at which the vehicle is interned to stop; and the brake controller feedback controls the braking force based on a deviation of the motor-rotation-speed-dependent running speed from the target running speed of the vehicle.

This form includes limitation as to execution details of the swinging-back reducing control. In this form, feedback control of the braking force based on a deviation of the vehicle running speed from the target vehicle running speed is executed utilizing the motor-rotation-speed-dependent running speed, so that the swinging-back reducing control can be accurately executed even when the vehicle running speed becomes considerably low. As for determination of the target vehicle running speed, the target vehicle running speed is determined such that the deceleration of the vehicle is gradually decreased from rite start time point of the swinging-back reducing control to the intended stop tine point, for instance. In this case, the swinging-back of the vehicle body on stopping of the vehicle can be reduced more effectively.

(6) The vehicle brake system according to Ute form (5), wherein a stop time point of the vehicle, at which the vehicle stops if the braking force at the start time point of the swinging-back reducing control is kept applied to the wheel, is defined as an estimated stop time point, and, wherein the brake controller sets the intended stop time point such that a time measured from the start time point is longer at the intended stop time point than at the estimated stop time point.

This form includes limitation as to a technique of decreasing the braking force in the swinging back reducing control. Specifically, a length of time from the start lime point to the intended step time point is longer than a length of time from the start time point to the estimated stop time point. This form enables the braking force to be appropriately decreased in the swinging-back reducing control.

(7) The vehicle brake system according to any one of the forms (1)-(6), which is installed on the vehicle in which is executed a control based on a wheel-rotation-speed-dependent running speed that is a running speed of the vehicle detected in dependence on a rotation speed of the wheel and in which detection accuracy of the motor-rotation-speed-dependent running speed is higher than detection accuracy of the wheel-rotation-speed-dependent running speed.

Ordinary vehicles include a wheel speed sensor for detecting a rotation speed of the wheel (wheel speed), for the purpose of executing the ABS control or the like, and the vehicle running speed is detected in dependence on the wheel speed detected by the wheel speed sensor. However, the accuracy of the thus detected vehicle running speed, i.e., the wheel rotation-speed-dependent running speed, is relatively low. In this form, the swinging-back reducing control docs not utilize the wheel-rotation-speed-dependent running speed that is an ordinarily vehicle running speed. Instead, the motor-rotation-speed-dependent running speed with high detection accuracy is utilized.

(8) The vehicle brake system according to any one of the forms (1)-(8),
wherein the vehicle on which the vehicle brake system is installed has a drive force transmitting mechanism configured to transmit the drive force from the electric motor to the wheel, and
wherein the brake controller issues a command for causing the electric motor to keep applying, to the wheel, a rotational levee small enough not to substantially move the vehicle, the rotational force being kept applied during execution of the swinging-back reducing control.

The drive force is transmitted from the electric motor to the wheel via the drive force transmitting mechanism including gears, for instance. The drive force transmitting mechanism has a backlash, a clearance or the like to some extent. Due to the influence of the backlash, the clearance or the like, there may occur a phenomenon that a change of the rotation speed of the wheel does not correspond to a change of the motor rotation speed. This form takes the phenomenon into account. That is, the rotational force in this form can prevent lowering of the accuracy of the motor-rotation-speed-dependent running speed caused by the backlash, the clearance or the like. The rotational force in this form mainly means the drive force generated by the electric motor. In a case where the electric motor is a constituent element of a regenerative brake device, namely, in a case where the braking force is applied to the wheel by electric power generation of the electric motor, the rotational force in this form may be the braking force applied by electric power generation of the electric motor.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Referring to the drawings, there will be explained in detail a vehicle brake system according to one embodiment of the present disclosure. It is to be understood that the present disclosure is sot limited to the details of the following embodiment but may be embodied based on the forms described in Various Forms and may be changed and modified based on the knowledge of those skilled in the art.

A. Structure of Vehicle on Which Vehicle Brake System is Installed

Figure 1:
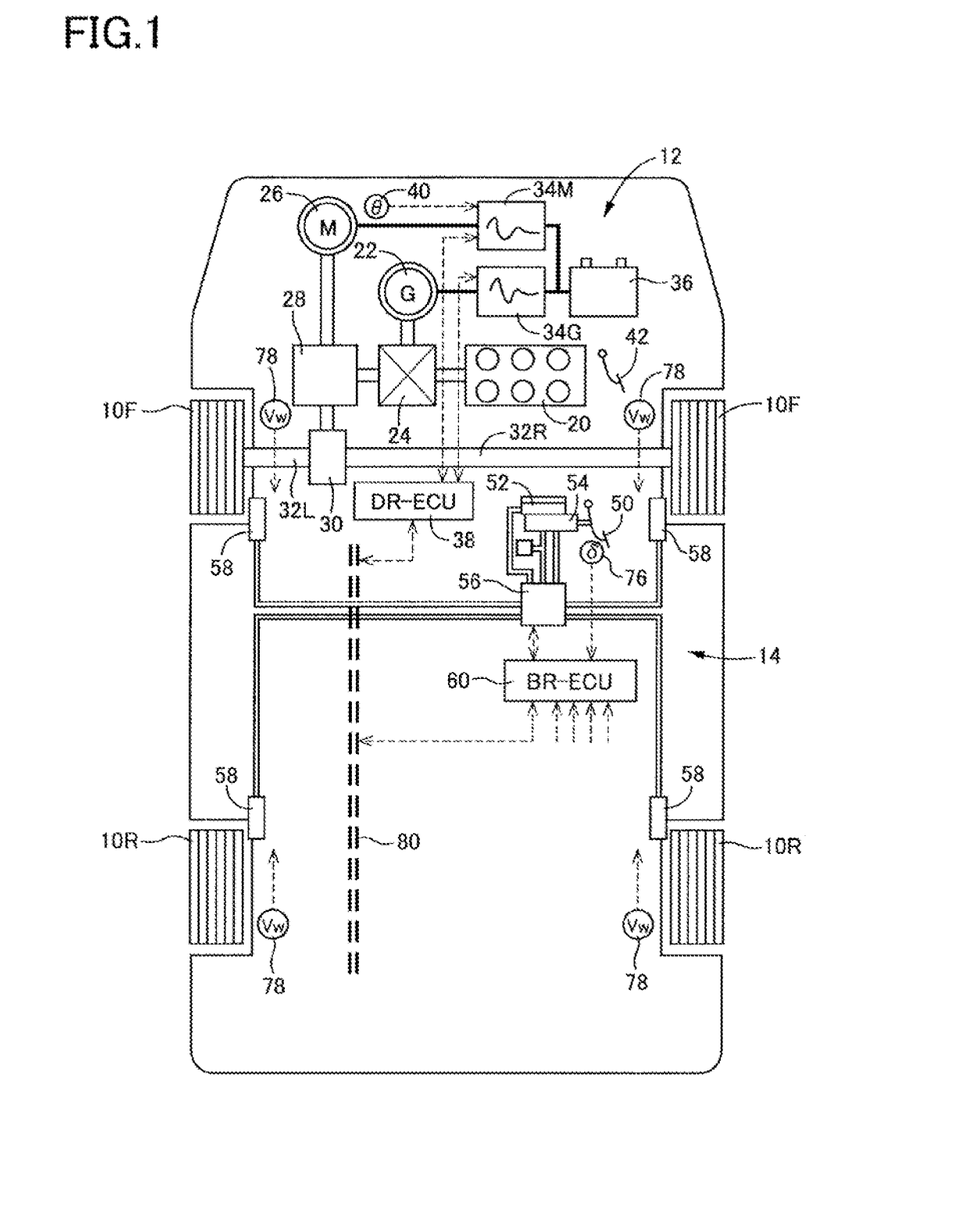
FIG. 1 is a schematic view illustrating an overall structure of a vehicle on which is installed a vehicle brake system according to one embodiment.

As shown in FIG. 1, a vehicle on which a vehicle brake system according to one embodiment of the present disclosure is installed is a front-wheel-drive vehicle including two front wheels 10F that are drive wheels and two rear wheels 10R. There are installed, on the vehicle, a hybrid vehicle drive system (hereinafter referred to as "drive system" where appropriate) 12 for driving the front wheels 10F and a vehicle brake system (hereinafter referred to as "brace system" where appropriate) 14 according to the embodiment. In the following explanation, a term "wheel 10" is used as a general term of the front wheels 10F and the rear wheels 10R where it is not necessary to distinguish the four wheels 10F, 10R from each other.

i) Hybrid Vehicle Drive System

The drive system 12 includes an engine 20 as a drive source, a generator 72 that functions mainly as an electric generator, a power distribution mechanism 24 to which the engine 20 and the generator 22 are connected, and an electric motor 26, as another drive source, that applies a drive force to the front wheels 10F. The power distribution mechanism 24 has a function of distributing rotation of the engine 20 to rotation of the generator 22 and rotation of tin output shaft. The electric motor 26 is connected to the output shaft via a reduction mechanism 28 functioning as a speed reducer. Rotation of the output shaft is transmitted to the front right and left wheels 10F via a differential mechanism 30 and respective drive shafts 32L, 32R, so that the front right and left wheels 10F are drivingly rotated.

The generator 22 is connected to a battery 36 via an inverter 34G. Electric energy obtained by electric power generation of the generator 22 is stored in the battery 36 as a power source. The electric motor 26 is connected also to the battery 36 via an inverter 34M. The electric motor 26 and the generator 22 are controlled by controlling the inverter 34M and the inverter 34G, respectively. Management of a charged amount of live battery 36 and control of the inverters 34M, 34G are executed by a hybrid drive electronic control unit 38 constituted by a computer that includes a CPU, a ROM, a RAM, etc., and drive circuits (drivers) for devices of the drive system 12. The hybrid drive electronic control unit 38 will be hereinafter referred to as "drive ECU 38" where appropriate.

The electric motor 26 is a three-phase brush less motor. The electric motor 26 is provided with a motor rotation angle sensor 40 for phase switching in electric current supply from the inverter 34M to the electric motor 26 in controlling the operation of the electric motor 26. The detection signal from the motor rotation angle sensor 40 is sent to the inverter 34M. The control of the operation of the generator 22 is similar to that of the electric motor 26, and its detailed explanation is dispensed with.

The drive system 12 includes an accelerator pedal 42 as an accelerator operation member. The drive ECU 38 determines a target drive force based on an operation amount of the accelerator pedal 42 and controls an output of the engine 20 and supply currents to the electric motor 25 and the generator 22 based on the target drive force. This control is an ordinary control and is not explained here.

The drive system 12 functions also as a regenerative brake device. When the vehicle is decelerated, the electric motor 26 rotates by rotation of the front wheels 10F without receiving electric power supply from the battery 36. The electric motor 26 generates electric power utilizing an electromotive force generated by rotation thereof, and the generated electric power is stored, via the inverter 34M, in the battery 36 as a quantity of electricity (which may be also referred to as an electric quantity or electric charge). That is, the electric motor 26 functions as an electric generator, so that the buttery 36 is charged. The rotation of the from wheels 10F is decelerated, namely, the vehicle is decelerated, by a degree corresponding to energy that corresponds to the charged electric quantity. In the present vehicle, the regenerative brake device is thus configured. The braking force applied by the regenerative brake device to the front wheels 10F (hereinafter referred to as "regenerative braking force" where appropriate) depends on the generated electric power amount, and the generated regenerative braking force is controlled by the control of the inverter 34M executed by the drive ECU 38.

ii) Vehicle Brake System

The brake system 14 according to the embodiment is an ordinary brake-by-wire hydraulic brake system. The brake system 14 includes a brake pedal 50 as a brake operation member, a master cylinder 54 to which the brake pedal 50 is connected and to which a reservoir 52 is attached, a brake actuator 56 including a high pressure source and configured to adjust a pressure of a working fluid supplied from the high-pressure source, four wheel brakes 58 which are disc brake devices and each of which applies the braking force to the corresponding wheel 10 by the working fluid supplied from the brake actuator 56, and a brake electronic control unit 60 as a brake controller configured to control the brake system 14. The brake electronic control unit 60 will be hereinafter referred to as "brake ECU 60" where appropriate. It is noted that a brake device configured to apply the braking force to the wheels 10 is constituted by the brake pedal 50, the master cylinder 54, the brake actuator 56, and the four wheel brakes 58.

Figure 2:
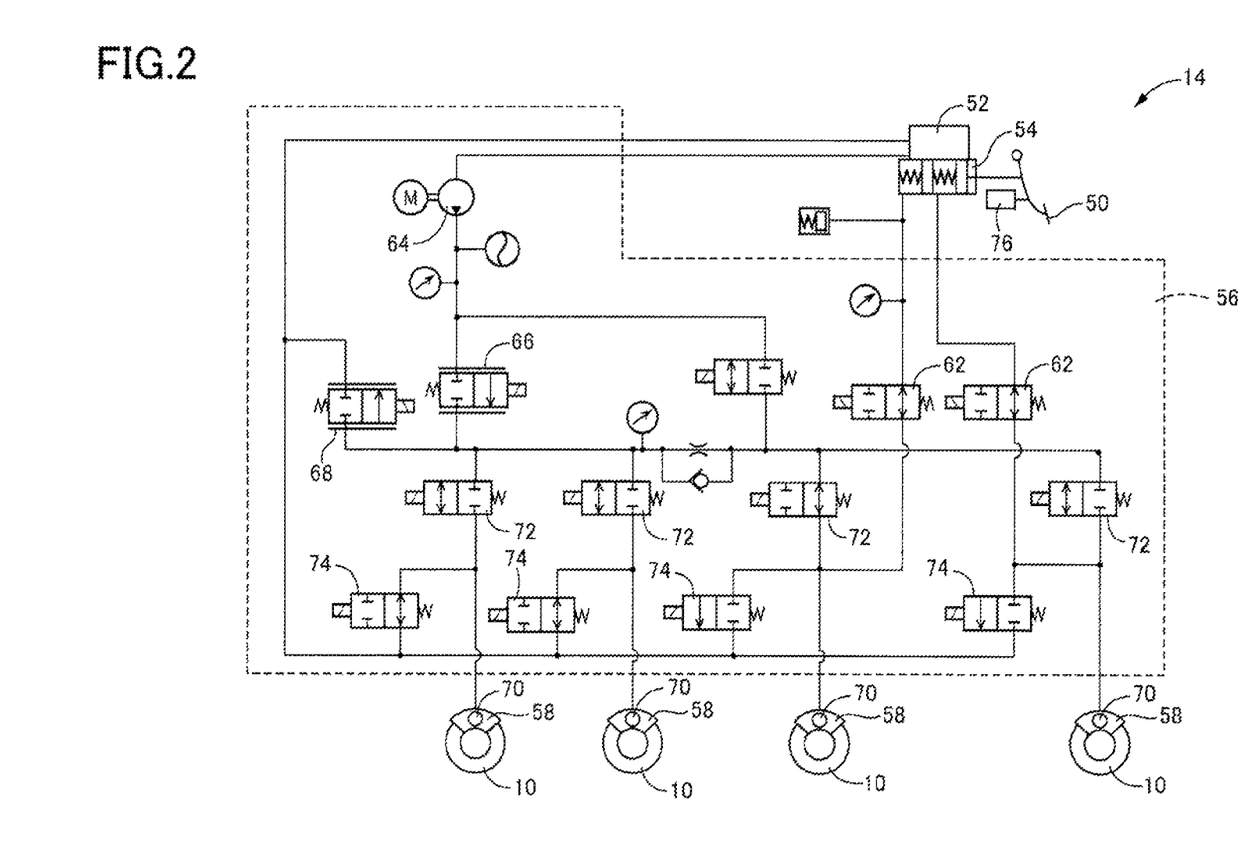
FIG. 2 is a view of a hydraulic circuit of the vehicle brake system according to the embodiment.

Referring also to the hydraulic circuit diagram of FIG. 2, the brake actuator 56 will be explained. The brake actuator 56 includes master cut valves 62 that shut off the working fluid pressurized by the master cylinder 54 under normal conditions. Under normal conditions, the pressure of the working fluid pumped up from the reservoir 52 and pressurized by a pump 64 as a high pressure source is adjusted by a pressure-increase linear valve 66 and a pressure-decrease linear valve 68, and the pressure-adjusted working fluid is supplied to wheel cylinders 70 of the respective wheel brakes 58. Each wheel brake 58 applies, to the corresponding wheel 10, the braking force (hereinafter referred to as "hydraulic braking force" where appropriate) that corresponds to the pressure of the working fluid supplied to the corresponding wheel cylinder 70. Though not explained in detail, the brake system 14 includes four pairs of open/close valves 72, 74 that correspond to the wheel brakes 58 of the four wheels 10 for the antilock operation. Under normal conditions, all of the open/close valves 72 are in the valve-open state, and all of the open/close valves 74 are in the valve-closed state.

The brake ECU 60 includes a computer constituted by a CPU, a ROM, a RAM, etc., and drive circuits of the puma 64, the pressure-increase linear valve 66, and the pressure-decrease linear valve 68. The brake ECU 60 controls electric currents supplied to the pressure increase linear valve 66 and the pressure decrease linear valve 68, so as to control the hydraulic braking force applied to each wheel 10. For obtaining the braking force required by a driver of the vehicle, the brake pedal 50 is provided with an operation amount sensor 76 for obtaining an operation amount of the brake pedal 50 (hereinafter referred to as "brake operation amount" where appropriate) as a degree of the operation of the brake operation member.

The present vehicle is provided with four wheel speed sensors 78 each of which detects a wheel rotation speed of the corresponding wheel 10 (hereinafter referred to as "wheel speed" where appropriate). The wheel speed sensors 78 are connected to the brake ECU 60. Though the way of detecting live wheel speeds is not explained here, the brake ECU 60 detects a running speed of the vehicle (hereinafter referred to as "vehicle speed" where appropriate) based on the wheel speeds of the wheels 10 detected by the respective wheel speed sensors 78. The detected vehicle speed is sent to other systems via a car area network or controllable area network (CAN) 80, and the other systems perform respective operations and controls utilizing the vehicle speed. The drive ECU 38 as the controller of the drive system 12 is connected also to the CAN 80, whereby be brake ECU 60 and the drive ECU 38 perform communication with each other via the CAN 80.

Basic control of the braking force in the brake system 14 is executed by the brake ECU 60 in the following manner. The brake ECU 60 determines a required overall braking force based on the brake operation amount obtained by the operation amount sensor 76. The requires overall braking force is the braking force application of which to the vehicle as a whole is demanded by the driver. The brake ECU 60 subsequently obtains, from the drive ECU 38, information as to a maximum regenerative braking force which is the regenerative braking force applicable at the present time. In a case where the required overall braking force can be covered by the maximum regenerative braking force, the brake ECU 60 issues, to the drive ECU 38, a command to apply the required overall braking force as the regenerative braking force. On the other hand, in a case where the required overall braking force cannot be covered by the regenerative braking force, the brake ECU 60 issues, to the drive ECU 38, a command to apply the maximum regenerative braking force. In the case where the required overall braking force cannot be covered by the regenerative braking force, the brake actuator 56 is controlled such that the braking force as the remainder obtained by subtracting the maximum regenerative braking force from the required overall braking force is generated as the hydraulic braking force by the brake system 14. This control is well known, and its explanation is dispensed with. In this respect, the brake ECU 60 issues, to the drive ECU 38, a command not to apply the regenerative braking force when the vehicle speed is lower than a set regenerative-brake-prohibition threshold speed. Further, distribution of the hydraulic braking force to the respective wheels 10 is performed according to a set distribution ratio. In the basic control of the braking force described above, the braking force whose magnitude corresponds to the operation of the brake operation member is applied to the wheels. In view of this, the basic control of the braking force will be hereinafter referred to as "brake-operation-dependent control" where appropriate.

The brake ECU 60 executes a control of the antilock operation, in other words, the brake ECU 60 executes what is called ABS control. The ABS control is well known, and its explanation is dispensed with. The ABS control is executed based on: the wheel speeds of the wheels 10 detected by the respective wheel speed sensors 78; and the vehicle speed detected based on the wheel speeds of the respective wheels 10. (This vehicle speed is the wheel-rotation-speed-dependent running speed and will be hereinafter referred to as "wheel-speed-dependent vehicle speed" where appropriate).

B. Swinging-Back Reducing Control for Reducing Swinging-Back of Vehicle Body on Stopping i) Overview of Swinging-Back Reducing Control for Reducing Swinging-Back of Vehicle Body on Stopping The swinging-back reducing control for reducing swinging-back of the vehicle body on stopping (hereinafter simply referred to as "swinging-back reducing control") aims at reducing swinging-back of the vehicle body when the vehicle is decelerated by the braking force and finally comes to a stop, namely, on stopping of the vehicle. In short, the swinging-back reducing control is for preventing the driver from feeling a jerk or a sudden jolt on stopping of the vehicle. A technique of executing the control will be explained. The swinging-back reducing control is executed while the vehicle speed v is being detected. In the swinging-back reducing control, immediately before the vehicle stops, specifically, from a time point when the vehicle speed v becomes equal to a set starting speed $v_{INT}$ (e.g. one-tenth of several kilometers per hour (km/h)) that is a set vehicle running speed, lie braking force F being applied at that lime point is weakened without relying on the brake operation of the driver. Specifically, the set starting speed $v_{INT}$ is determined in advance so as to be lower than the regenerative-brake prohibition threshold speed $v_{PR}$ (e.g., several kilometers per hour (km/h). The hydraulic braking force $F_{HY}$ starts to be decreased from the time point when the vehicle speed v becomes equal to the set starting speed $v_{INT}$.

ii) Detection of Vehicle Running Speed

As explained above, the swinging-back reducing control is executed while the vehicle speed v is being detected. Further, the swinging-back reducing control is started after the vehicle speed v becomes considerably low. Thus, the vehicle speed v needs to be detected with high accuracy for achieving high control accuracy.

Figure 3A:
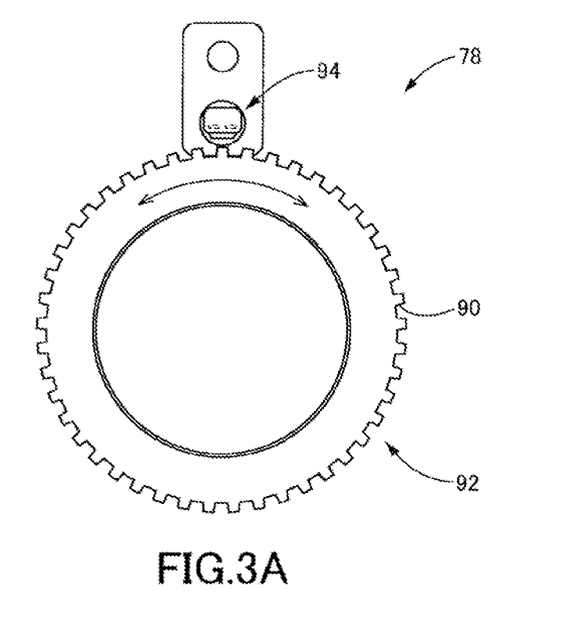
FIG. 3A is a view for explaining a structure of a wheel speed sensor provided for each wheel.

The wheel speed sensor 78 described above is ordinarily has a structure schematically illustrated in FIG. 3A. Specifically, the wheel speed sensor 78 includes: a gear-like rotor 92 having teeth 90 formed in its outer edge and configured to rotate with the wheel 10; and a detecting element 94 having a Hall element, a magnetic pickup or the like and disposed so as to be opposed to the outer edge of the rotor 92. In the thus constructed wheel speed sensor 78, the detecting dement 94 detects a magnetic variation caused by the rotor 92, so that the wheel speed $v_W$ is detected.

As apparent from FIG. 3A the rotor 92 has only several tens of teeth 90 formed at an equiangular pitch on one circumference of the rotor 92. Accordingly, the wheel speed sensor 78 can detect the magnetic variation of only several tens of periods per one rotation of the wheel 10. Here, the wheel speed sensor 78 is configured to generate one pulse signal for the magnetic variation of one period. In this case, the wheel speed sensor 78 can generate the detection signal of only several tens of pulses per one rotation of the wheel 10. That is, detectivity (resolving power) of the wheel speed sensor 78 is relatively low, and the accuracy of the vehicle speed v detected based on the wheel speed $v_W$ detected by the wheel speed sensor 78 is not necessarily high. In other words, the detection accuracy of the vehicle speed v is inevitably low, and it is not necessarily appropriate to utilize the wheel-speed-dependent vehicle speed v in the swinging-back reducing control that starts to be executed from the time point when the vehicle speed v becomes considerably low.

In view of the above, the brake system 14 utilizes, as the vehicle speed v with high detection accuracy, the vehicle speed v detected based on the motor rotation speed $v_M$ detected by the motor rotation angle sensor 40 provided for the electric motor 26 of the drive system 12. (This vehicle speed v, i.e., the motor-rotation-speed-dependent running speed, will be hereinafter referred to as "motor-rotation-speed-dependent vehicle speed" where appropriate.) The brake system 14 executes the swinging-back reducing control based on the motor-rotation-speed-dependent vehicle speed v.

Figure 3B:
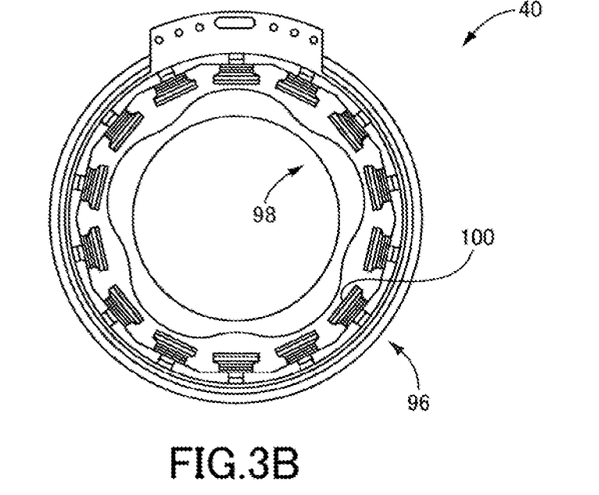
FIG. 3B is a view for explaining a structure of a motor rotation angle sensor of an electric motor of a hybrid vehicle drive system.

As the motor rotation angle sensor 40, a resolver having a structure illustrated in FIG. 3B is ordinarily used. The motor rotation angle sensor 40 includes a stator 96 fixed to a housing of the electric motor 26 and a rotor 98 which is fitted on a rotation shaft (output shaft) of the electric motor 26 so as to rotate with the rotation shaft. The stator 96 includes magnetic poles 100 on each of which a winding wire is wound. The magnetic poles are disposed on an inner circumferential portion of the stator 96 so as to be arranged at an equiangular pitch on one circumference. The rotor 98 has, on its outer circumference, a plurality of protrusions formed at an equiangular pitch on one circumference so as to be opposed to the magnetic poles 100. A rotational phase of the rotation shaft of the electric motor 26 and a motor rotation speed $v_M$ that is a rotation speed of the electric motor 26 are detected based on electric currents that flow through the winding wires of the magnetic pole 100 and that change in accordance with rotation of the rotation shaft of the electric motor 26. The rotation of the rotation shaft of the electric motor 26 will be simply referred to as "rotation of the electric motor 26" where appropriate.

The motor rotation angle sensor 40 is configured to generate the detection signal of several thousands of pulses per one rotation of the electric motor 26, and detectivity (resolving power) of the motor rotation speed $v_M$ is high. A ratio between the motor rotation speed $v_M$ and the wheel speed $v_W$ is determined as a certain ratio based on a speed reduction ratio of the reduction mechanism 28, etc. When the speed reduction ratio is taken into account, the motor rotation angle sensor 40 generates the detection signal of several tens of thousands of pulses per one rotation of the wheel 10. Accordingly, the detection accuracy of the vehicle speed v detected in dependence on the wheel speed $v_W$ estimated based on the detection signals of the motor rotation angle sensor 40 is high, namely, the detection accuracy of the motor-rotation-speed-dependent vehicle speed v detected based on the motor rotation speed $v_M$ is high. Thus, the control accuracy of the swinging-back reducing control executed utilizing the vehicle speed v is high.

iii) Details of Swinging-Back Reducing Control

The preconditions for executing the swinging-back reducing control are that the vehicle is being decelerated, namely, the vehicle speed v is decreasing and deceleration G of the vehicle is not greater than set deceleration $G_0$. The former is an essential condition because the swinging-back reducing control is configured to be executed immediately before the vehicle stops, and the latter is a condition for excluding execution of the swinging-back reducing control in a situation in which hard braking is being applied to the vehicle. As explained above, the deceleration of the vehicle is equivalent to the braking force being applied to the vehicle. That is, the product of the deceleration and the weight of the vehicle corresponds to the braking force. Thus, the latter condition may be regarded as a condition that the braking force F is not greater than the set braking force. Under the preconditions, the swinging-back reducing control starts at the time point when the vehicle speed v, specifically, the motor-rotation-speed-dependent vehicle speed v, is decreased down to the set starting speed $v_{INT}$.

Figure 4:
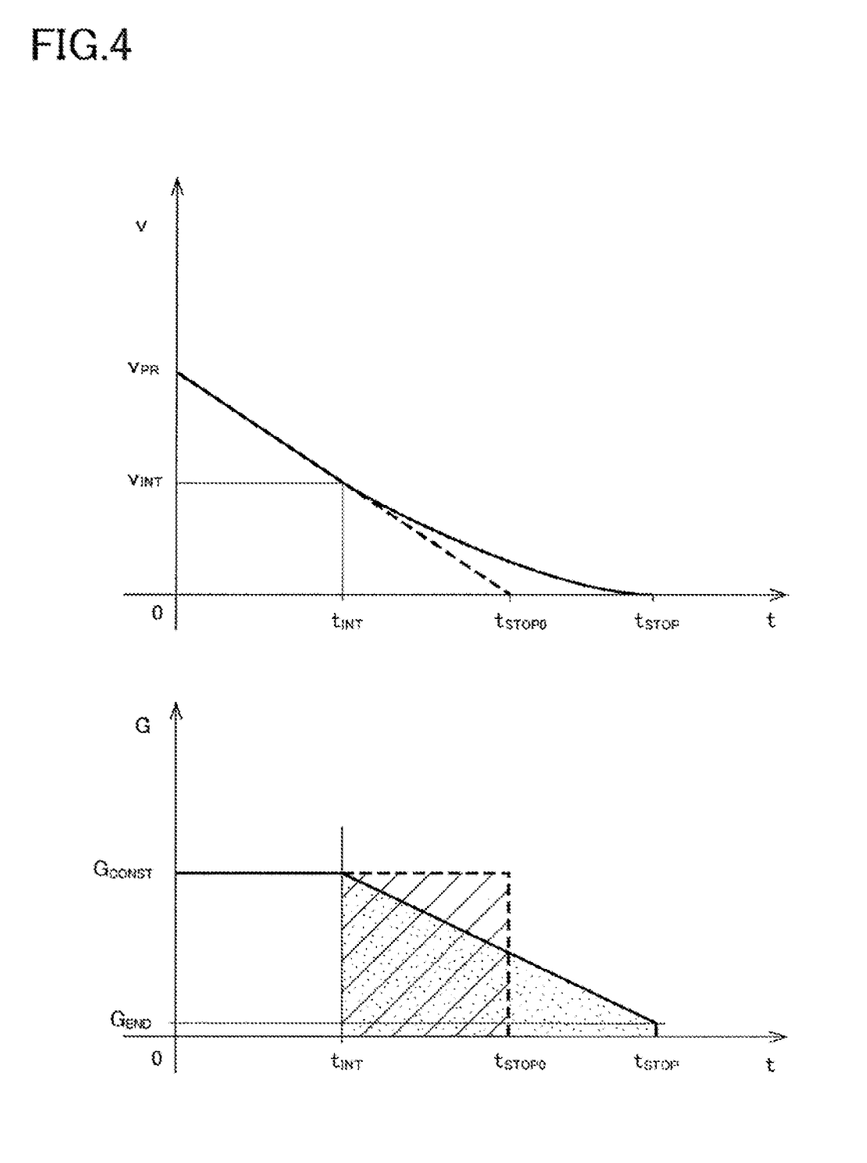
FIG. 4 shows graphs respectively showing a change of a running speed of the vehicle and a change of deceleration of the vehicle in a swinging-back reducing control for reducing swinging-back of a vehicle body on stopping.

The graphs of FIG. 4 respectively indicate a temporal change of the vehicle speed v and a temporal change of the deceleration G when the swinging-back reducing control starts to be executed from a control shirt time point $t_{INT}$, which is a time point when the vehicle speed v reaches the set starting speed $v_{INT}$, in a case where the deceleration G of the vehicle is constant, namely, in a case where a constant braking force F is being applied to the vehicle.

If the swinging-back reducing control is not executed even at the control start time point $t_{INT}$ in a slate in which constant deceleration $G_{CONST}$ is being generated, the vehicle speed v linearly decreases (without involving any change in the gradient) with a lapse of time from a start-time vehicle speed that is the vehicle speed v at the control start time point $t_{INT}$ to an estimated stop time point $t_{STOP0}$, as indicated in the dashed line. (Here, the start-time vehicle speed is regarded as being equivalent to the set starting speed $v_{INT}$ mentioned above. Thus, the start-time vehicle speed will be hereinafter referred to as "start-time vehicle speed $v_{INT}$" where appropriate.) In this instance, the deceleration G is abruptly decreased from $G_{CONST}$ to 0 at the estimated stop time point $t_{STOP0}$. This is a main cause for relatively large swinging-back of the vehicle body caused when the vehicle stops.

In the brake system 14, therefore, the hydraulic braking force $F_{HY}$ is applied from the control start time point $t_{INT}$ such that the deceleration G linearly decreases with a lapse of time from $G_{CONST}$ (hereinafter referred to as "start-time deceleration" where appropriate) to end-time deceleration $G_{END}$. The end-time deceleration $G_{END}$ is set at a slight value as a margin for causing the vehicle to surely stop. Here, the time point at which the vehicle stops in the case where the hydraulic braking force $F_{HY}$ is thus applied is defined as an intended stop time point $t_{STOP}$. The intended stop time point $t_{STOP}$ is determined such that an area of a batched region and an area of a dotted region are equal to each other in the graph, namely, such that work performed by the hydraulic braking force $F_{HY}$ is equal. Specifically, the following expression holds:

$$G_{CONST} * t_{STOP0} = ((G_{CONST} + G_{END})/2) * t_{STOP}$$

Consequently, the intended stop time pout $t_{STOP}$ is determined by the following expression:

$$t_{STOP} = 2 * G_{CONST} * t_{STOP0}/(G_{CONST} + G_{END})$$

When the swinging-back reducing control is executed, the change of the deceleration G with a lapse of time from the control start time point $t_{INT}$ to the intended stop time point $t_{STOP}$ (with a lapse of time in a case where the start time point $t_{INT}$ is represented as 0) is determined as deceleration change function G(t) represented by the following expression, based on the above expression:

$$G(t) = G_{CONST} - ((G_{CONST} - G_{END})/t_{STOP}) * t$$

Based on the deceleration change function G(t), a target vehicle speed (target vehicle running speed) v*, which is the vehicle speed v as a target in the swinging-back reducing control, is determined so as to became lower with a lapse of time according to the following expression:

$$v^* = v_{INT} - (G(t) * t$$

In the swinging-back reducing control, the hydraulic braking force $F_{HY}$ to be applied is feedback controlled according to the following expression based on a vehicle speed deviation Δv that is a deviation of the actual vehicle speed v from the target vehicle speed v*, namely, a deviation of the motor-rotation-speed-dependent vehicle speed v detected in dependence on the motor relation speed $v_M$ from the target vehicle speed v*:

$$F_{HY} = \alpha * (v^* - v) = \alpha * \Delta v$$

wherein α is a gain.

Figure 5:
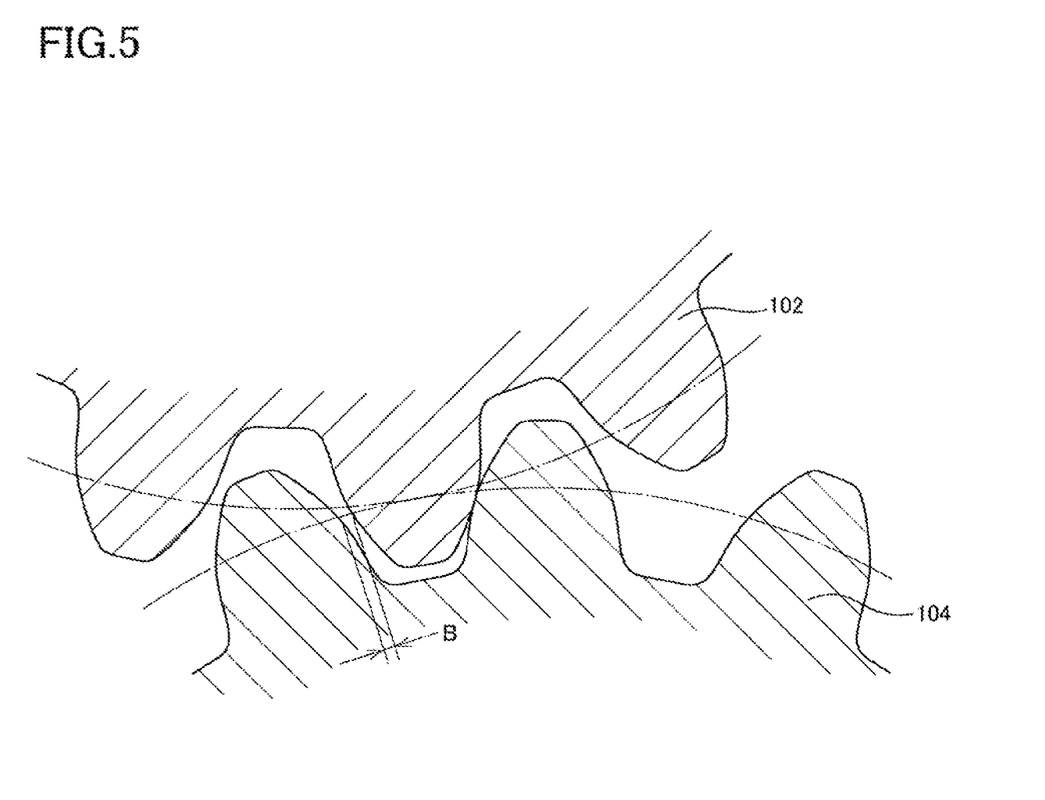
FIG. 5 is a view for explaining a backlash in a drive force transmitting mechanism.

According to the swinging-back reducing control explained above, the hydraulic braking force $F_{HY}$ to be applied is weakened, so trial a stopping distance of the vehicle from the control start lime point $t_{INT}$ slightly increases. The stopping distance is a traveling distance of the vehicle from the control start time point $t_{INT}$ to the time point when the vehicle stops. In a case where the start-time deceleration $G_{CONST}$ is 1 m/s² and the start-time vehicle speed $v_{INT}$ is 0.5 km/h, the stopping distance when the swinging-back reducing control is not executed is about 10 mm whereas the stopping distance when the swinging-back reducing control is executed is about 20 mm, for instance. In other words, the stopping distance when the swinging-back reducing control is executed is twice as large as the stopping distance when the swinging-back reducing control is not executed. Such a small increase in the stopping distance can effectively reduce the swinging-back of the vehicle body on stopping of the vehicle.

iv) Application of Rotational Force in Detection of Motor-Rotation Speed-Dependent Running Speed The drive system 12 includes a drive force transmitting mechanism including the reduction mechanism 28, the differential mechanism 30, etc. The rotation of the electric motor 26 is transmitted to the wheels 10F via the drive force transmitting mechanism. The drive force transmitting mechanism includes a plurality of gears meshing with each other. As shown in FIG. 5, slight backlashes B are present between the gears. (In FIG. 5, a backlash between a first gear 102 and a second gear 104 is illustrated). Clearances such as the backlashes B in the drive force transmitting median ism cause a difference between the rotation angle of the electric motor 26 and the rotation angle of the wheel 10F, adversely influencing the detection accuracy of the motor-rotation-speed-dependent vehicle speed v.

In view of the above, the electric motor 26 of the present vehicle is operated so as to prevent occurrence of wobbling or looseness due to the clearances in a time period during which the motor-rotation-speed-dependent vehicle speed v is employed as the vehicle speed v. Specifically, the brake ECU 60 issues, to the drive ECU 38, a command for causing the electric motor 26 to keep applying, to the wheels 10F, a rotational force, i.e., a drive force, small enough not to substantially move the vehicle. The drive ECU 38 controls the electric motor 26 to keep generating the slight rotational drive force. Such an operation of the electric motor 26 enables detection of the motor-rotation-speed-dependent vehicle speed v in a state in which the clearances are removed in one direction. In other words, such an operation of the electric motor 26 enables detection of the motor-rotation-speed-dependent vehicle speed v in a state shown in FIG. 5 in which the teeth of the first gear 102 and the teeth of the second gear 104 mesh with each other on the same side, namely, in which only one of opposite side faces of each tooth of the first gear 102 and only one of opposite side faces of each tooth of the second gear 104 are held in contact with each other. As a result, the detection accuracy of the motor-rotation-speed-dependent vehicle speed v is high.

v) Control Flow of Braking Force

Figure 6:
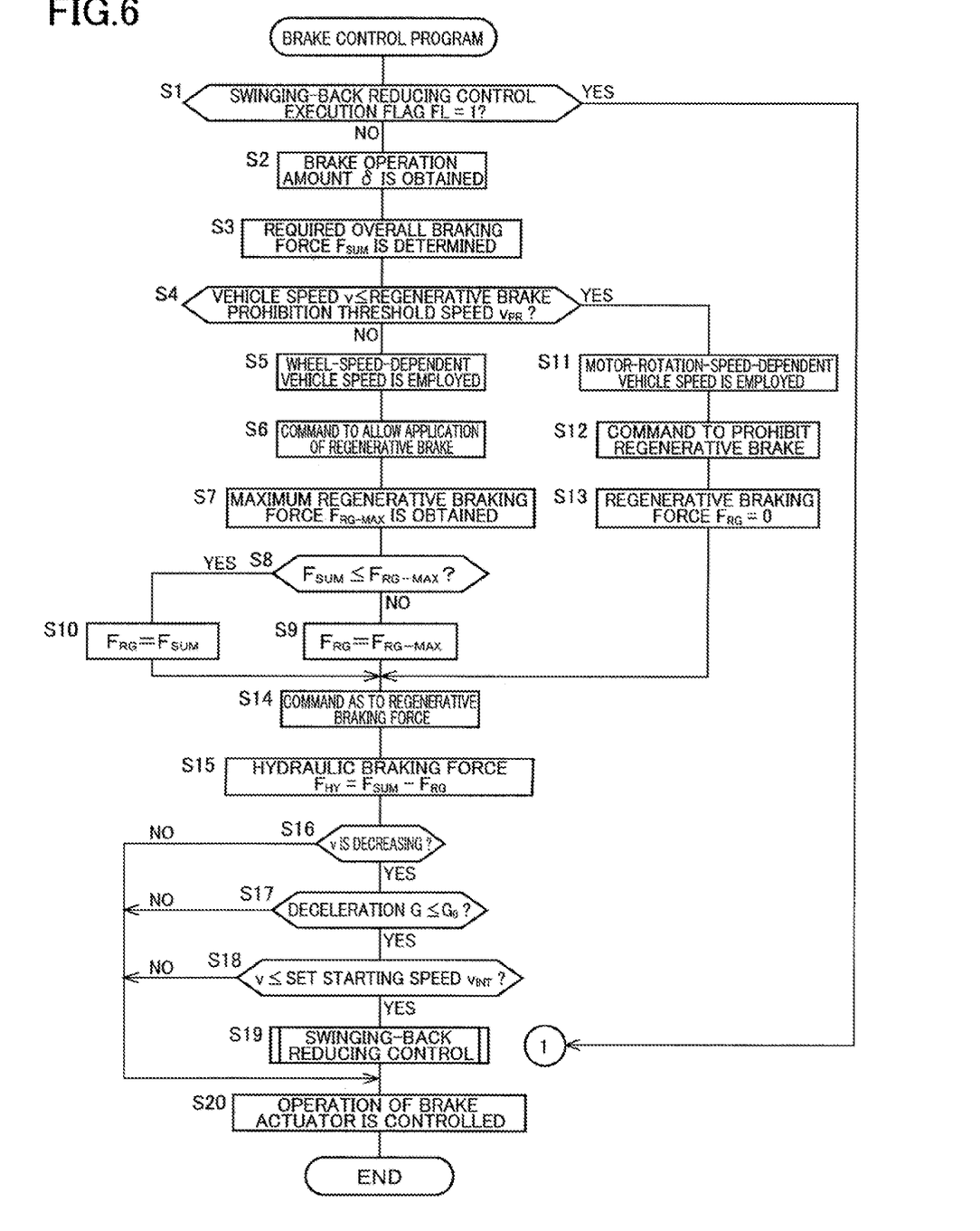
FIG. 6 is a flowchart indicating a brake control program executed in the vehicle brake system according to the embodiment.

The brake ECU 60 executes a brake control program indicated by a flowchart of FIG. 6 at a short time pitch, e.g., about several to several tens of milliseconds (msec), so that the controls of the braking force in the brake system 14, i.e. the brake-operation-dependent control and the swinging-back reducing control, are executed. There will be hereinafter explained briefly a control flow according to the program.

In processing according to the brake control program, a flag value of a swinging-back reducing control execution flag FL is judged at Step 1. (Hereinafter, Step 1 is abbreviated as "S1". Other steps are similarly abbreviated.) The flag value of the flag FL is "1" when the swinging-back reducing control is executed while the flag value is "0" when the swinging-back reducing control is not executed.

When it is determined at S1 that the swinging-back reducing control is not executed, processing at S2 and subsequent steps is executed. At S2, the brake operation amount δ, which is the operation amount of the brake pedal 50, is obtained based on detection by the operation amount sensor 76. At S3, the required overall braking force $F_{SUM}$, which is the braking force F required for the vehicle as a whole, is determined based on the brake operation amount δ.

At S4, it is determined whether one of the wheel-speed-dependent vehicle speed v and the motor-rotation-speed-dependent vehicle speed v dial is currently employed is not higher than the regenerative-brake-prohibition threshold speed $v_{PR}$. When it is determined at S4 that tie vehicle speed v is higher than the regenerative-brake-prohibition threshold speed $v_{PR}$, it is subsequently determined at S5 that the wheel-speed-dependent vehicle speed v is employed thereafter as the vehicle speed v. In this case, a command to allow application of the regenerative brake is issued to the drive ECU 38 at S6.

At S7, information as to the maximum regenerative braking force $F_{RG-MAX}$, which is the regenerative braking force $F_{RG}$ that is applicable at the present time, is obtained from the drive ECU 38. At S8, the required overall braking force $F_{SUM}$ and the maximum regenerative braking force $F_{RG-MAX}$ are compared. In a case where the required overall braking force $F_{SUM}$ is larger than the maximum regenerative braking force $F_{RG-MAX}$, the regenerative braking force $F_{RG}$ that should be generated is determined to be equal to the maximum regenerative braking force $F_{RG-MAX}$ at S9. In a case where the required overall braking force $F_{SUM}$ is not larger than the maximum regenerative braking force $F_{RG-MAX}$, the regenerative braking force $F_{RG}$ that should he generated is determined to be equal to the required overall braking force $F_{SUM}$ at S10.

When it is determined at S4 that the vehicle speed v is not higher than the regenerative-brake-prohibition threshold speed $v_{PR}$, it is subsequently determined at S11 that the motor-rotation-speed-dependent vehicle speed v is employed thereafter as the vehicle speed v. In this case, a command to prohibit the regenerative brake is issued to the drive ECU 38 at S12. At S13, the regenerative braking force $F_{RG}$ that should be generated is made equal to 0.

The command as to the regenerative braking force $F_{RG}$ determined in one of S9, S10, S13 is issued to the drive ECU 38 at S14. The drive ECU 38 generates the regenerative braking force $F_{RG}$ based on the command. At S15, the regenerative braking force $F_{RG}$ that should be generated is subtracted from the required overall braking force $F_{SUM}$, whereby the hydraulic braking force $F_{HY}$ that should be generated is determined.

Figure 7:
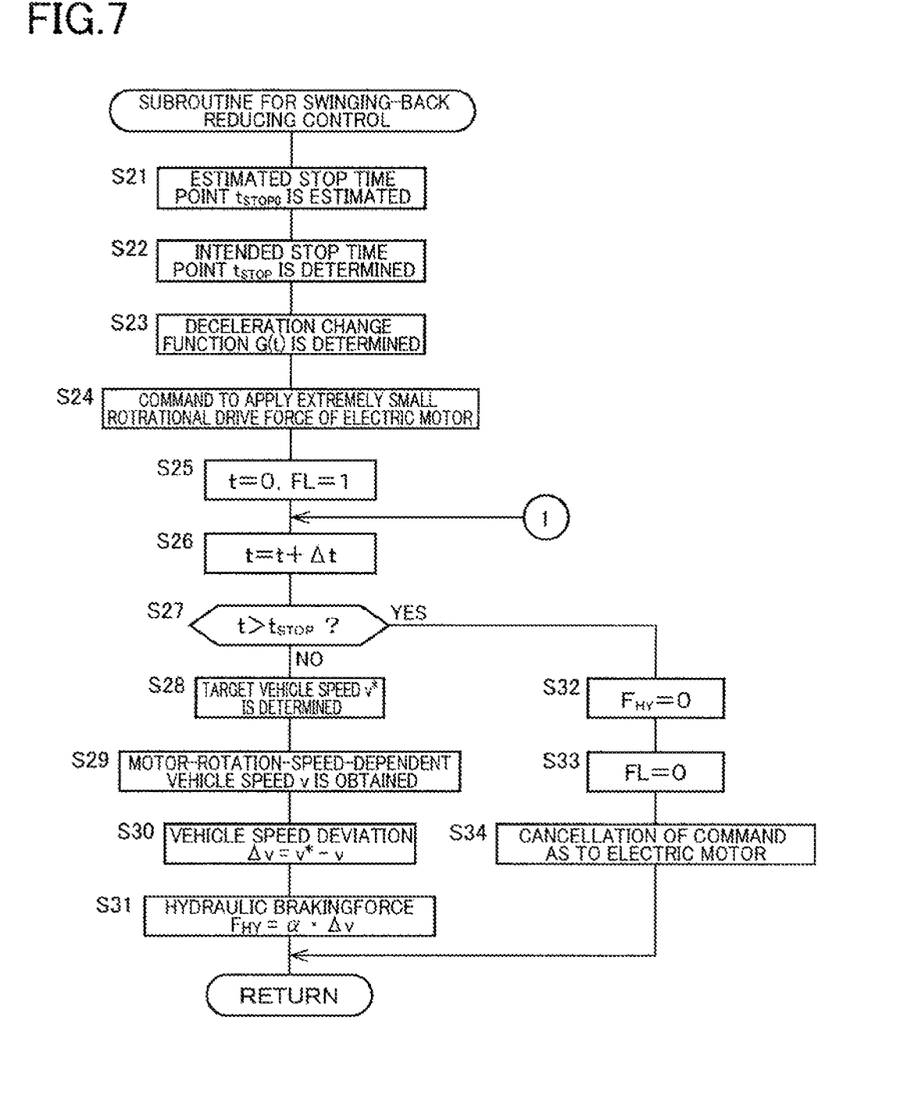
FIG. 7 is a flowchart indicating a subroutine for the swinging-back reducing control as a part of the brake control program.

Processing at subsequent steps, i.e., S16-S18, is for determining whether the conditions for executing the swinging-back reducing control are satisfied or not. As the preconditions, it is determined at S16 whether the vehicle speed v is decreasing and it is determined at S17 whether the deceleration G of the vehicle is not greater than the set deceleration $G_0$. As a starting condition that is a trigger for starting the swinging-back reducing control, it is determined at S18 whether the vehicle speed v, namely, the motor-rotation-speed-dependent: vehicle speed v, is not higher than the set starting speed $v_{INT}$. When it is determined that the conditions of S16-S18 are all satisfied, the swinging-back reducing control at S19, that is, a subroutine for the swinging-back reducing control indicated by a flowchart of FIG. 7, is executed.

In processing according to the subroutine for the swinging-back reducing control, steps S21-S25 correspond to initial processing of the swinging-back reducing control. At S21, the estimated step time point $t_{STOP0}$ is estimated based on the start-time vehicle speed $v_{INT}$ and the start-time deceleration $G_{CONST}$. At S22, the intended stop time point $t_{STOP}$ is determined. At S23, the deceleration change function G(t) is determined according to the technique explained above. At S24, the command to keep applying, to the wheels 10F, the drive force small enough not to move the vehicle, i.e., the extremely small rotational drive force, is issued to the drive ECU 38. At S25, a timer for indicating a lapse of time from the control start time point $t_{INT}$ is reset to thereby set the swinging-back reducing control execution flag FL to "1".

After the initial processing or when it is determined at S1 that the swinging-back reducing control is being executed, the timer is incremented at S26 by a count-up value Δt equal to the time pitch of execution of the program. It is determined at S27 whether the value of the timer is larger than the intended stop time point $t_{STOP}$. That is, it is determined whether the execution of the swinging-back reducing control should be continued or should be ended.

When it is determined at S27 that execution of the swinging-back reducing control should be continued, the target vehicle speed v* is determined at S28 according to the technique explained above. At 29, the vehicle speed v, i.e., the motor-rotation-speed-dependent vehicle speed v, is obtained. At S30, the vehicle speed deviation Δv is calculated. At S31, the hydraulic braking force $F_{HY}$ that should be generated is determined based on the vehicle speed deviation Δv.

On the other hand, when it is determined at S27 that the execution of the swinging-back reducing control should be ended, the hydraulic braking force $F_{HY}$ that should be generated is made equal to 0 at S32. At S33, the swinging-back reducing control execution flag FL is reset. At S34, a command to cancel the extremely small rotational drive force that is being applied by the electric motor 26 to the wheels 10F is issued to the drive ECU 38.

At S20, the brake actuator 56 is controlled based on the hydraulic braking force $F_{HY}$ determined at S15 when the swinging-back reducing control is not being executed or the brake actuator 56 is controlled based on the hydraulic braking force $F_{HY}$ determined at S31 or S32 when the swinging-back reducing control is being executed. Specifically, the electric currents to be supplied to the pressure-increase linear valve 66 and the pressure-decrease linear valve 68 are determined, and the determined electric currents are supplied to the pressure-increase linear valve 66 and the pressure-decrease linear valve 68.

What is claimed is:

1. A vehicle brake system installed on a vehicle equipped with an electric motor that applies a drive force to a wheel, comprising:
   a hydraulic brake device including (a) a brake operation member to be operated by a driver, (b) a brake actuator including a high pressure source and configured to adjust a pressure of a working fluid supplied from the high-pressure source, and (c) a wheel brake configured to apply a braking force to the wheel by the working fluid supplied from the brake actuator; and
   a brake controller configured to control the braking force,
   wherein the controller is configured to execute a brake-operation-dependent control in which the braking force having a magnitude corresponding to an operation of the brake operation member is applied to the wheel by the hydraulic brake device,
   wherein the brake controller is configured to execute a swinging-back reducing control for reducing swinging-back of a body of the vehicle on stopping by weakening the braking force of the hydraulic brake device immediately before the vehicle stops, based on a motor-rotation- speed-dependent running speed that is a running speed of the vehicle detected in dependence on a rotation speed of the electric motor in place of a wheel-rotation-speed-dependent running speed that is a running speed of the vehicle detected in dependence on a rotation speed of the wheel detected by a wheel speed sensor, and
   wherein the brake controller is configured to execute the swinging-back reducing control such that:
   the brake controller determines a target running speed of the vehicle such that the running speed of the vehicle gradually decreases from a start time point of the swinging-back reducing control to an intended stop time point of the vehicle that is a stop time point at which the vehicle is intended to stop; and
   the brake controller performs a feedback control to control the braking force based on a deviation of the motor-rotation-speed-dependent running speed from the target running speed of the vehicle.

2. The vehicle brake system according to claim 1, wherein the brake controller is configured to execute the swinging-back reducing control on precondition that the braking force applied in the brake-operation-dependent control is not greater than a set braking force.

3. The vehicle brake system according to claim 1, wherein the brake controller is configured to start the swinging-back reducing control at a time point when the motor-rotation-speed-dependent running speed becomes equal to or lower than a set running speed of the vehicle.

4. The vehicle brake system according to claim 1,
   wherein a stop time point of the vehicle, at which the vehicle stops when the braking force at the start time point of the swinging-back reducing control is kept applied to the wheel, is defined as an estimated stop time point, and,
   wherein the brake controller sets the intended stop time point such that a time measured from the start time point is longer at the intended stop time point than at the estimated stop time point.

5. The vehicle brake system according to claim 1, which is installed on the vehicle in which detection accuracy of the motor-rotation-speed-dependent running speed is higher than detection accuracy of the wheel-rotation-speed-dependent running speed.

* * * * *